No. 786,148. PATENTED MAR. 28, 1905.
G. W. PICKARD & H. J. W. FAY.
SIGNAL SYSTEM FOR ELECTRIC RAILWAYS.
APPLICATION FILED JAN. 28, 1905.
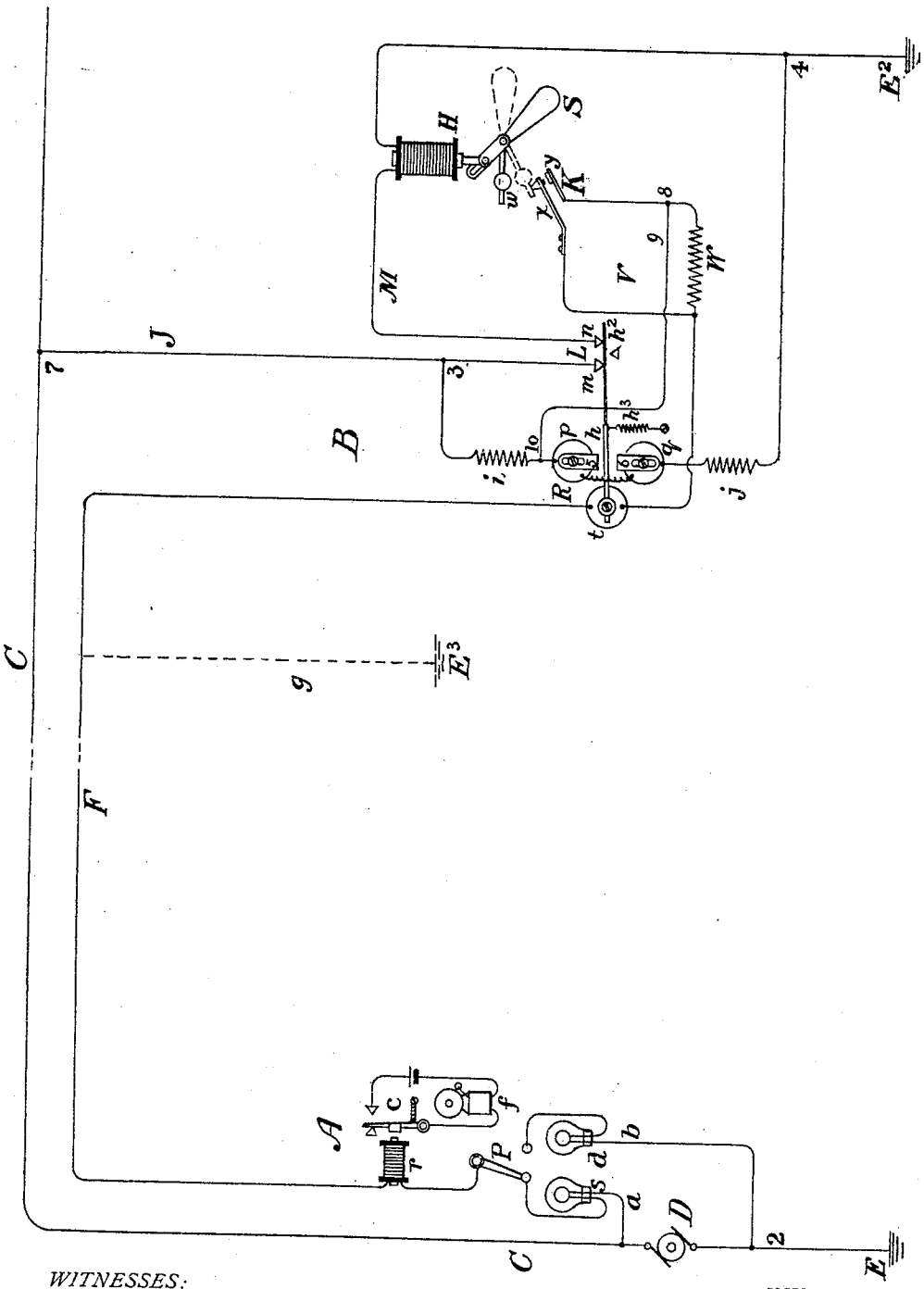
WITNESSES:
Joseph A. Gately
Geo. Willis Pierce
INVENTORS,
Greenleaf W. Pickard
BY Harold J. W. Fay
Thomas D. Lockwood
ATTORNEY.

No. 786,148. Patented March 28, 1905.

UNITED STATES PATENT OFFICE.

GREENLEAF WHITTIER PICKARD, OF AMESBURY, AND HAROLD J. W. FAY, OF WESTBORO, MASSACHUSETTS, ASSIGNORS TO AMERICAN TELEPHONE AND TELEGRAPH COMPANY, A CORPORATION OF NEW YORK.

SIGNAL SYSTEM FOR ELECTRIC RAILWAYS.

SPECIFICATION forming part of Letters Patent No. 786,148, dated March 28, 1905.

Application filed January 28, 1905. Serial No. 243,080.

*To all whom it may concern:*

Be it known that we, GREENLEAF WHITTIER PICKARD, residing at Amesbury, in the county of Essex, and HAROLD J. W. FAY, residing at Westboro, in the county of Worcester and State of Massachusetts, have invented certain Improvements in Signal Systems for Electric Railways, of which the following is a specification.

This invention relates to signals for electric railways, and more particularly concerns improvements in such electric signals tending to simplification and increased certainty of action.

The objects of the invention are to provide means for the ready and positive control of a railway-signal at an outlying or road station or point from a principal or despatcher's station, to furnish means which in the event of a broken or grounded signal-circuit conductor shall operate to set or maintain the signal at said road-station in its display or danger position, and to afford facilities for indicating at the said principal station the position or change of position of the road-station signal, howsoever produced, and for giving warning also at said principal station of the occurrence and existence of the above-mentioned or other abnormal circuit conditions.

Systems of electrical railroad-signals which heretofore have been devised or advocated have, so far as we are aware, involved apparatus depending mainly for its operation upon "marginal" or relatively small differences of current or potential, and hence have necessarily been complex and not altogether trustworthy.

The system of our invention avoids the employment of small differences in current strength, employs direct currents of both directions of current, operates by the reversal or cessation of the current through a winding of a polarized relay, enables the signal at the outlying station to be responsive in its display and withdrawal to the operation of a simple pole-changing or switching device at the principal station, and involves safety and danger signals at the principal station capable of being brought into the circuit alternatively, according to the position of said switching device, and thereupon to be responsive to the movements of the said outlying-station signal and to indicate at the said principal station the position and operations of such signal.

Among the advantages of our apparatus are the facts that in case of either a break, a ground, or a similar circuit trouble or fault in any part of the signaling-circuit the outlying-station signal at once assumes the position of display or danger, and that such faults are enabled to appropriately indicate their occurrence or presence upon the circuit-conductors at the principal station also.

The drawing which accompanies this specification to illustrate the invention is a diagram of the electrical arrangement of our system, the several appliances employed being indicated by the usual conventional symbols.

In the said drawing, A is a principal or despatching station of an electric railway; B, an outlying or road signal station or point where cars may be signaled; C, the trolley or feed-wire or other main supply-conductor extending from said principal station to said signaling-station and along the railway generally; F, a signal-circuit conductor associated with the said main supply-conductor and extending between said principal and outlying stations; D, a dynamo furnishing current to both of said conductors, and E E² the regular earth connections of the system.

One pole of the dynamo is connected by wire 2 to earth E and the other to the main supply-conductor C, which thus receives an operating-current of definite and uniform direction.

At the despatching-station are two signals, shown as small glow-lamps *s* and *d*, connected in the circuit of two alternative terminal branches *a b* of the signal-circuit conductor F, the branch *a* being extended from that pole of the dynamo which connects with the main supply-conductor, while the branch *b* is similarly extended from the grounded pole of the dynamo, and is thus, in fact, itself also grounded. A switch device P, adapted to act as a current-reverser, is placed between the signal-current conductor and its terminal branches, its lever or movable element being attached to the principal-station end of said conductor and its contact-buttons to the ends of said terminal branches $a$ and $b$, respectively.

As will hereinafter be more particularly explained, the outer end of the signal-conductor F terminates in a conductive connection with an earth branch of the main supply-conductor C, and it follows that when the switch P is in the position shown and the signal-conductor F thereby connected, through branch $a$ and lamp-signal $s$, with that pole of the dynamo to which the main supply-conductor is attached the current of the said associated signal-conductor has the same direction as that of the main supply-conductor; but when the position of the switch P is changed to connect the said associated conductor at its principal-station end, through the alternative terminal branch $b$ and the signal-lamp $d$, to the opposite pole of the dynamo and to ground the current flowing in said signal-conductor is now received from the main supply-conductor by way of its outer conductive connection with the grounded branch of the latter and the direction of such current flowing in said signal-conductor is reversed. The switch device P thus constitutes a means for transferring the signal-conductor from either of the signals $s$ and $d$ to the other and also for the simultaneous reversal of the direction of the current circulating in said signal-conductor.

At the principal or despatching station we also provide an alarm-bell, "buzzer," or like device $f$ to produce a sharp audible signal, this being preferably connected up in a local circuit $c$, controlled by a relay $r$, introduced into the circuit of the signal-conductor.

Referring now to the appliances and arrangement at the outlying station or point B, where the road-signal is placed, the signaling device consists of a semaphore-arm S, having a suitable counterweight $w$, an actuating electromagnetic helix or solenoid-magnet H therefor, and a polarized relay R, controlling the said magnet.

J is the branch from the main supply-conductor at the outlying station to earth at $E^2$, to which reference has been made. $i$ and $j$ are resistances introduced into said branch to economize current.

M is a second earth branch of the main supply-conductor diverging from the branch J at a point 3 thereof between the resistance $i$ and the main conductor C and extending to a reconnection with the first branch at 4, and thus to earth $E^2$.

W is a resistance device connected in the circuit of the signaling-current conductor. V is a short-circuiting shunt therefor, and K is a circuit-closing device controlling the continuity of said shunt and consisting of contact-pieces $x\,y$ at the ends of said shunt, which when brought into contact with one another act to establish the shunt round the said resistance device, thereby withdrawing the resistance from the circuit of the signal-current conductor F.

L is the circuit-controlling device for the solenoid-circuit M and is shown as being provided with contact members $m$ and $n$, which under normal conditions are united to close the solenoid-circuit earth branch, but which otherwise are disunited to open the circuit of the second earth branch M and prevent the flow of current therein. The actuating solenoid-magnet H of the semaphore-signal is connected in said earth branch M and when current circulates in said branch attracts its core and holds the semaphore in safety position; but when current no longer flows the solenoid releases the core and the counterweighted semaphore rises and assumes its danger position.

The controlling polarized relay R has its magnet-coils $p$ and $q$ connected in the first-mentioned earth branch J of the main supply-conductor between the two current-reducing resistances, so that the supply-conductor current of uniform direction constantly passes through said coils; but the magnetizing effect produced in the relay pole-pieces 5 and 6 by this current is not of itself sufficient to cause in the armature an attractive tendency toward either pole-piece. The armature $h$ of the relay R has for itself a separate and independent energizing-coil $t$ in the circuit of the signal-conductor F, and the polarity set up in said armature by the action of coil $t$ when the said conductor F is connected to the ungrounded pole of the dynamo and when, therefore, the direction of the current flowing in conductor F is the same as that of the current in conductor C is such that said armature is attracted toward pole-piece 5 and repelled from pole-piece 6. A counter-spring $h^3$, attached to the armature, tends to retract it toward pole-piece 6.

The earth branch J at the road signal-station leaves the main supply-wire at 7 and extends by way of point 3, through resistance $i$, the magnet-coils $p$ and $q$ of polarized relay R, the resistance $j$, and the junction-point 4, to earth at $E^2$.

The signal-circuit conductor F after passing through the exciting-coil $t$ of the polarized-relay armature $h$ continues through resistance device W and then by the junction-point 8 and conductor 9 to a point 10 between coil $p$ of the polarized relay R and the reducing resistance $i$, this point 10 being an approximately mid-resistance point of the entire supply-circuit branch J or, stated otherwise, a point of approximately midway potential between the supply-conductor and the earth. Obviously the signal-circuit conductor is thus provided with an earth connection at E² through the relay-magnet coils and resistance J.

The armature $h$ of relay R operates the circuit-controlling device L of the signal-operating branch circuit M and is shown as being for this purpose provided with a conducting extension $h^2$, which when said armature is attracted toward pole-piece 5 of the relay-magnet acts to conductively unite the contact members $m$ and $n$ of said circuit-controlling device and to close the circuit of said branch circuit M and when the armature is retracted to separate them and open the circuit of said branch.

The resistances $i$ $j$ and W should be of considerable magnitude, while that of the solenoid H must be correspondingly proportioned in a manner well understood. We have found one thousand ohms for each of the reducing resistances $i$ and $j$, fifteen hundred ohms for the resistance device W, and about five hundred ohms for the solenoid H to answer well; but we do not restrict ourselves to these magnitudes and proportions, since they are of course subject to wide variation under varying conditions.

As long as the current in the signal-circuit conductor F has the same direction as that constantly circulating in the supply-conductor C the attraction of the polarized-relay armature toward pole-piece 5 will continue; but on the reversal or cessation of the current through said signal-circuit conductor F, and consequently through the armature-coil $t$, the relay will respond by the movement of its armature under the influence of the spring $h^3$ to the opposite pole-piece 6. Indeed, it may be said more generally that the relay would be responsive to the reversal or cessation of current in either magnet or armature coils, provided the current remains unchanged in the other.

By taking current for the operation of the signals at road-stations from the supply-conductor of the railway system we are enabled to operate our signal system satisfactorily with but one additional circuit-conductor—viz., the signal-circuit conductor F.

The drawing represents the system under normal or safety conditions, with the switch device P at the despatching-station turned to the left, so that the signal-circuit conductor is connected to the same pole of the dynamo as is the supply-conductor and so that the lamp $a$ is in the circuit. The said lamp for this reason is known as the "safety-signal." Under these conditions a steady current flows from the supply-conductor at the outlying station, through the coils $p$ and $q$ of relay R and the resistances $i$ and $j$, to earth, and a similar current flows through the armature-coil $t$ of relay R from the signal-circuit conductor F. The magnetization resulting from these currents holds the armature $h$ in its position attracted toward pole-piece 5 and overcomes the pull of the counter-spring $h^3$. In this position of said armature it effects the closure in the circuit-controller L of the local branch circuit M, and current flowing therein energizes the actuating magnet or helix H, which accordingly keeps its core drawn in, thus holding the semaphore-arm S in the safety or withdrawn position. At this time the current through the safety signal-lamp is so weak, due to the pressure in the circuit of the resistance W, that the said lamp burns with but a dull red glow.

When at the despatching-station it is desired to set the semaphore in the danger position, the switch device P is moved to the right so that the signal-wire is connected to ground and to the opposite pole of the dynamo through the terminal branch $b$ and the lamp-signal $d$, which lamp-signal therefore is known as the "danger-signal." Current through the signal-conductor, and consequently through the armature-coil $t$ of relay R, by this action has its direction reversed, finding its way from the supply-conductor to the signal-conductor by way of point 7, branch J, point 3, resistance $i$, point 10, conductor 9, point 8, resistance W, and relay-armature coil $t$. The armature $h$ (in virture of such reversal) is now drawn over to the pole-piece 6, opening the circuit of branch conductor M at the points $m$ and $n$ of circuit-controller L. The electromagnetic helix H in this circuit being no longer excited drops its core and the counterweighted semaphore-signal rises to its horizontal or danger position. (Shown by the drawing in broken lines.) It is necessary to afford an indication at the despatching-station that the danger-signal has duly responded, and for this purpose we have provided the resistance device W, its shunt V, and the shunt circuit-closer K. The circuit-closer K is mounted within range of the semaphore-arm and in such relation thereto that the said arm when in its danger position is enabled to act thereon and to bring its contact members $x$ and $y$ together, the shunt V being thereby closed and the resistance W short-circuited. The current in the signal-conductor F is by this means materially increased, and the danger signal-lamp at the despatching-station, which thus far has burned with the dull red glow produced by the normal current, is now caused to glow with full brilliancy, thus indicating the operation of the distant signal.

Obviously should the outlying signal for any reason fail to operate the resistance W will not be withdrawn from the signal-circuit and the danger lamp will continue to glow dimly. Furthermore, should the semaphore-signal at the road-station from any reason other than principal-station control assume the danger position the safety-lamp signal, which under these conditions retains its place in the circuit and which normally displays but feeble luminosity, will at once brighten to its full brilliancy. The said two lamps, in conjunction with the road-station resistance W and its short-circuiting devices, constitute an effective return-signal apparatus adapted to afford at the principal station an indication from which the position of the road-signal at the outlying point may reasonably be inferred.

Should the signal-circuit be opened, for example, by the breaking at any point of the signal-circuit conductor F, the current would no longer circulate through the armature-winding $t$ of the relay R, and the said armature would at once be pulled by the spring $h^3$ toward the pole-piece 6 and away from the contact-points $m$ $n$, thus opening the circuit M of the actuating-magnet H and releasing the semaphore, which at once assumes the danger position. At the same time the open-circuit alarm $f$ at the despatching-station A is operated by the falling back of the armature of its relay $r$ and the closure of its local circuit $c$ and calls attention as loudly as may be desired to the fact that the signal-circuit is broken.

In case the signal-conductor should become grounded at any point (such an accidental earth connection $E^3$ being indicated by broken lines at $g$) the semaphore-arm will similarly assume the danger position, for in this instance the working current through the signel-conductor received from the ungrounded pole of the dynamo through the branch $a$ and signal-lamp $s$ will be diverted to earth at the fault $g$ and will leave the armature-winding $t$ of the polarized relay without current. Current from the supply-conductor will, however, continue to flow through the magnet-coils $p$ $q$; but the armature being no longer magnetized has no special magnetic bias to either side and yielding to the pull of the counter-spring $h^3$ will move over to its lower position toward pole-piece 6 and open the circuit M of the actuating-magnet H. The signal-lamp at station A receiving the effect of the full potential of the dynamo line-terminal will be burned out, and the signal-circuit being thereby opened between the dynamo earth connection and the accidental earth $E^3$ will operate the alarm-bell $f$.

It is evident that should the current through the magnet-coils $p$ $q$ of the polarized relay R for any reason cease or become reversed the action of the relay would be the same as that occurring by reason of the cessation or reversal of current through the armature-winding $t$. Such action in the case under consideration would of course be due to the neutralization of the magnet-cores and the continued magnetization of the armature; but in either case the armature is permitted to yield to the pull of the counter-spring and to move in the direction to open the circuit of the semaphore-actuating magnet.

Having thus described our invention and its mode of operation, we claim—

1. In a signaling system for electric railways, the combination at a principal or despatching station, with the railway main supply or feed conductor; and its source of current; of an associated signal-circuit conductor also receiving current from said source; safety and danger signals arranged for alternative connection in circuit with said associated conductor; and means for transferring said conductor from either of said signals to the other, and for simultaneously reversing the direction of the current circulating therein; substantially as set forth.

2. In a signaling system for electric railways, a signal controlling or transmitting apparatus, comprising the railway power transmission or feed conductor; an associated signal-circuit conductor; a dynamo supplying current to both of said conductors; safety and danger signal lamps connected in alternative terminal branches of said signal-circuit conductor extending from the opposite poles of said dynamo respectively; and a switch device placed between said signal-current conductor and said terminal branches thereof, and adapted to connect said conductor through either signal-lamp to the corresponding dynamo-pole; substantially as described.

3. In a signaling system and at an outlying station or point thereof, the combination of a power-transmission or feed circuit conductor; a signal-circuit conductor; a polarized relay having magnet and armature helices connected in circuit with said conductors respectively; a semaphore or similar visible signal; a solenoid actuating said semaphore in a branch of said power-transmission-circuit conductor controlled by said relay; and means actuated by said semaphore when moved to its position of display for increasing the current in said signal-circuit conductor; substantially as and for the purposes specified.

4. In a signaling system for electric railways, a signal receiving and displaying apparatus, consisting of a conductor extending from the feed or power-transmission railway circuit; a signal-circuit conductor; a semaphore or similar visible signal; an actuating-solenoid for said semaphore in a branch of said railway-circuit conductor; a polarized relay having magnet and armature helices included in said railway-circuit and signal-circuit conductors respectively, controlling said solenoid; a resistance device connected in the said signal-circuit conductor; a shunt round said resistance; and a circuit-closer for said shunt actuated by said semaphore when moved to its danger position, to short-circuit said resistance; substantially as set forth.

5. In a signaling system for electric railways, the combination of a current-generator; a main supply or feed conductor, and an associated signal-conductor connected with said generator and extending between a principal station and an outlying or road station; a current-reversing switch device at said principal station placed between said signaling-conductor and the poles of said generator and organized to transfer said conductor from either pole to the other; a polarized relay at the said outlying station having magnet and armature exciting coils connected with said main and associated conductors respectively, said relay being responsive to the operation of said reversing-switch; a semaphore or similar visible signal also at said outlying station; and an actuating electromagnetic helix therefor, in a branch of said main conductor controlled by said relay; substantially as set forth.

6. In a signaling system for electric railways, a return-signal apparatus to indicate at a despatching-station the position of a semaphore-signal at a road-station, consisting of a signal-circuit conductor extending between said stations; a source of current for said conductor, alternative terminal branch connections from said conductor to the two poles respectively of said source, and a signal glow-lamp in each of said alternative branches, at the said despatching-station; a semaphore or similar visible signal at said road-station; a resistance device, also at said road-station, connected in the said signal-conductor; a short-circuiting shunt round said resistance; and a circuit-closer for said shunt actuated by said semaphore in its changes of position, to close or open said shunt round said resistance, and, by the consequent differences in available current volume, to vary the display of the said signal-lamps at the transmitting-station; substantially as specified.

7. A signaling system for electric railways, consisting of the railway main supply or feed conductor and an associated signal-circuit conductor both extending between a principal or despatching station and an outlying station; a current-generator common to both; a road or outlying signal apparatus comprising a semaphore-signal, an actuating-magnet therefor in an earth branch of said main conductor, a polarized relay controlling said actuating-magnet having magnet and armature exciting helices connected in a second earth branch of said main conductor and in said associated conductor respectively, said relay being responsive to the reversal and cessation of current in either of said helices, all at said outlying station, and at the principal station, alternative circuit-terminal connections from the two poles of said generator for said signal-circuit conductor, and a switch device for the transfer of said conductor from either to the other to reverse the current in said conductor; and a despatching-station return-signal apparatus comprising glow-lamp signals one in each of said alternative circuit connections at said despatching-station, together with a resistance device in said signal-circuit conductor, a short-circuiting shunt therefor, and a circuit-closer for said shunt actuated by said semaphore to establish and disestablish said shunt according as the said semaphore is displayed or withdrawn, all at said outlying station; substantially as set forth.

8. A signaling system for electric railways, consisting of the railway main supply or feed conductor, and an associated signal-circuit conductor both extending between a principal or despatching station and an outlying or road signal station; a current-generator common to both; a road-station signal apparatus comprising a high-resistance earth branch of said main conductor, a polarized relay having magnet-coils in said earth branch and an armature-magnetizing coil connected between said associated conductor and an approximately mid-resistance point of said earth branch, said relay being responsive to the reversal or cessation of current in either magnet or armature coils, a semaphore-signal and an actuating magnet-helix for said signal in a separate earth branch of said main conductor controlled by said relay, all at said road-station, and a switch device at said principal station for the transfer of said conductor from either pole of said generator to the other; and a principal-station return-signal apparatus comprising a resistance device in said associated conductor at said road-station, together with means actuated by said semaphore-signal in its position of display for short-circuiting said resistance and for thereby increasing the strength of current in the said associated conductor; and an electric lamp responsive by its full glow to such increased current in the circuit of said associated conductor at said principal station; substantially as specified.

In testimony whereof we have signed our names to this specification, in the presence of two subscribing witnesses, this 26th day of January, 1905.

GREENLEAF WHITTIER PICKARD
HAROLD J. W. FAY.

Witnesses:
GEO. WILLIS PIERCE,
JOSEPH A. GATELY.